United States Patent [19]
Saidi et al.

[11] Patent Number: 5,851,696
[45] Date of Patent: *Dec. 22, 1998

[54] RECHARGEABLE LITHIUM BATTERY

[75] Inventors: M. Yazid Saidi; Jeremy Barker, both of Henderson, Nev.

[73] Assignee: Valence Technology, Inc., Henderson, Nev.

[ * ] Notice: This patent issued on a continued prosecution application filed under 37 CFR 1.53(d), and is subject to the twenty year patent term provisions of 35 U.S.C. 154(a)(2).

[21] Appl. No.: 593,636

[22] Filed: Jan. 29, 1996

[51] Int. Cl.⁶ .................................................. H01M 4/48
[52] U.S. Cl. ................................................................ 429/218
[58] Field of Search ............................................... 429/218

[56] References Cited

U.S. PATENT DOCUMENTS

| | | | |
|---|---|---|---|
| 4,228,226 | 10/1980 | Christian et al. | 429/194 |
| 4,464,447 | 8/1984 | Lazzari et al. . | |
| 4,668,595 | 5/1987 | Yoshino et al. | 429/194 |
| 4,792,504 | 12/1988 | Schwab et al. . | |
| 4,830,939 | 5/1989 | Lee et al. . | |
| 4,935,317 | 6/1990 | Fauteux et al. . | |
| 4,983,476 | 1/1991 | Slane et al. . | |
| 4,990,413 | 2/1991 | Lee et al. . | |
| 5,037,712 | 8/1991 | Shackle et al. . | |
| 5,135,732 | 8/1992 | Barboux et al. . | |
| 5,147,739 | 9/1992 | Beard | 429/194 |
| 5,262,253 | 11/1993 | Golovin . | |
| 5,284,721 | 2/1994 | Beard | 429/218 |
| 5,300,373 | 4/1994 | Shackle . | |
| 5,316,877 | 5/1994 | Thackeray et al. | 429/218 |
| 5,401,599 | 3/1995 | Tahara et al. | 429/218 |
| 5,418,090 | 5/1995 | Koksbang et al. . | |
| 5,419,890 | 5/1995 | Saidi . | |
| 5,435,054 | 7/1995 | Tonder et al. . | |
| 5,478,671 | 12/1995 | Idota | 429/218 |
| 5,482,697 | 1/1996 | Saidi | 423/592 |

FOREIGN PATENT DOCUMENTS 6029043  4/1994  Japan .

OTHER PUBLICATIONS

International Serarch Report Form PCT/ISA/210 Dated 5 May 1997 and Mailed 23 May 1997.

J. Barker, "Three Electrode Electrochemical Voltage Spectroscopy (TEVS): Evalustion of a Model Lithium Ion System", Electrochimica Acta, vol. 40, No. 11, 1603–1608, 1995.

H. Huang and P. Bruce, "A 3 Volt Lithium–Manganese Oxide Cathode for Rechargeable Lithium Batteries", J. Electrochem. Soc., vol. 141, No. 7, Jul. 1994.

Koksbang et al., "V6013 electrodes in rechargeable lithium batteries", Prog. Batteries Battery Mater. (1995) 14(Lithium Ion Battery Technologe), 125–36.

Macklin et al., "Structural Changes in Vanadium Oxide-–Based Cathodes During Cycling in a Lithium Polymer Electrolyte Cell", Electrochim Acta, vol. 37, No. 9, pp. 1715–1720, 1992.

(List continued on next page.)

*Primary Examiner*—Kathryn L. Gorgos
*Assistant Examiner*—Carol Chaney

[57] ABSTRACT

The present invention provides an electrochemical cell or battery, which has a nonmetal negative electrode (anode). That is, no solid metal active material is used in the cell. Rather than the conventional solid lithium metal anode, the active material of the new anode comprises a compound of vanadium oxide. Accordingly, the lithium cell of the invention comprises a positive electrode and a negative electrode, where the negative electrode comprises a compound of vanadium oxide which in a fully discharged state is represented by the nominal general formula $V_6O_{13}$ or $Li_yV_6O_{13}$, y equal to 0; and, in a fully or partially lithiated, fully or partially charged state, is represented by the nominal general formula $Li_yV_6O_{13}$, where y is greater than 0 and less than or equal to 8. The unique negative electrode of the invention demonstrates exceptional performance without the disadvantages of metallic lithium negative electrodes.

4 Claims, 8 Drawing Sheets

Voltage profile of a 3-electrode assymmetrical $V_6O_{13}/Li_xMn_2O_4$ cell

OTHER PUBLICATIONS

Gustafsson et al., "The Polymer Battery as an Environment For In Situ X–Ray Diffraction Studies . . . ", Electrochim. Acta vol. 37, No. 9, pp. 1639–1643, 1992.

Julien et al., "Solid State atteries: Materials Design and Optimization", Kluwer Academic Publishers, p. 475, 1994.

Julien et al., "Solid State Batteries: Materials Design and Optimization" pp. 474–487 no month, 1994.

RECHARGEABLE LITHIUM BATTERY

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells typically include an anode (negative electrode) of metallic lithium, a cathode (positive electrode) typically a transition metal chalcogenide and an electrolyte interposed between spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the electrolyte and then back to the lithium negative electrode.

Lithium batteries, with metallic lithium electrodes, have a limited life-cycle due to the degradation of the metallic lithium electrodes. Lithium is attacked and/or passivated by electrolytes. This results in formation of lithium powder with a very high surface area at the interface between the metallic lithium and the electrolyte. The formation of high surface area lithium powder is undesirable because it reacts violently with moisture and air.

In U.S. Pat. No. 4,464,447, Lazzari et al have proposed using a material of the formula $Li_xM_2O_3$ to prepare a negative electrode (anode) where M is Fe. This approach has certain limitations because the reversible capacity of such electrode appears to be rather small. In U.S. Pat. No. 5,147,739, Beard suggests composite anodes comprising metallic lithium anode substrate in combination with one or more lithium insertion compounds as a coating on metallic lithium. In U.S. Pat. No. 5,418,090 (PCT/US94/01489), Koksbang and Shackle suggest an electrochemical cell which has an anode of lithium manganese oxide; or both the anode and cathode are formed of lithium manganese oxide. In U.S. Pat. No. 4,983,476, Slane et al. suggest a lithium battery that avoids use of metallic lithium by using a transition metal sulfide as the anode.

It has recently been suggested to replace the lithium metal anode with a carbon anode such as coke or graphite which are intercalation compounds. Such negative electrodes are used with lithium containing cathodes, in order to form an $Li_xC$ anode. Such cells, in an initial condition, are not charged. In order to be used to deliver electrochemical energy, such cells must be charged in order to transfer lithium to the carbon from the lithium containing cathode. During discharge the lithium is transferred from the anode back to the cathode. During subsequent recharge, the lithium is transferred back to the anode where it reintercalates into the carbon. The use of carbon anodes poses certain problems. It is known that $Li_xC$ is a reactive material which is difficult to handle and reacts with air and moisture. Accordingly, it is necessary to produce the anode material $Li_xC$ in situ in a cell in order to obtain a state of charge. In doing so, some of the lithium which is transferred to the anode upon initial charging, is irretrievably intercalated into the anode in an irreversible process. This occurs because some of the intercalated lithium is not deintercalated from the anode during subsequent discharge resulting in loss of capacity since such lithium is not available for electrochemical interaction to produce electrical energy. Furthermore, it is known that cells containing carbon anodes exhibit progressive loss of capacity over subsequent charge and discharge cycles due to the aforementioned phenomena. This progressive loss is referred to as "capacity fade".

Despite the varieties of cells comprising nonmetallic anodes (negative electrodes) there remains a need for an improved cell having an operating voltage within a practical range for commercial use. There also remains an unfulfilled need for a cell which exhibits good cycling capability and which can withstand repeated charge and discharge without loss of capacity.

Based upon the shortcomings of the prior art and in view of the fact that the aforementioned cells have not achieved commercial use, there remains a need for electrochemical cells that are capable of providing improved performance. Therefore, what is needed is an improved anode which is an alternative to present metallic lithium anodes and which simultaneously fulfills the requirements of high reactivity, good charge rate capabilities, acceptable cycle life, relatively low specific rate, stability, and low cost. There is also needed an improved electrochemical cell which combines the improved anode with an optimum cathode for operation within voltage ranges necessary for widespread commercial use and which also simultaneously fulfills the requirements of improved performance, better cycle life, better specific electrode capacities, relatively high energy density, low specific weight, stability, and low cost.

SUMMARY OF THE INVENTION

The present invention provides an electrochemical cell or a battery which has a nonmetal negative electrode (anode). The battery comprises a positive electrode and a negative electrode, the negative electrode comprises a compound of vanadium oxide, represented by the nominal general formula $Li_yV_6O_{13}$, where y is greater than or equal to 0 and less than or equal to 8. ($Li_yV_6O_{13}$ is further defined as $Li_yV_6O_{13+z}$ below.) The vanadium oxide compound in a fully or partially lithiated state, corresponding to a fully or partially charged state, is represented by the nominal general formula $Li_yV_6O_{13}$, where y is greater than 0 and less than or equal to 8. The vanadium oxide compound in an unlithiated, uncharged state, or fully discharged state, is represented by the nominal general formula $Li_yV_6O_{13}$, with y equal to 0, corresponding to $V_6O_{13}$. (Note $V_6O_{13}$ is further defined as $V_6O_{13+z}$ below.) In one embodiment, the positive electrode comprises a metal chalcogenide. Desirably, the positive electrode of the cell comprises a lithiated transition metal oxide compound or a lithium transition metal oxide compound. The positive electrode active material has an electrochemical potential versus lithium (metallic lithium) greater than the electrochemical potential versus metallic lithium of the negative electrode.

The nominal general formulas, $V_6O_{13}$ and $Li_yV_6O_{13}$, respectively, represent a range of vanadium oxide compounds further defined as $V_6O_{13+z}$ and $Li_yV_6O_{13+z}$ where z is equal to or greater than 0 and less than 2. It is preferred that z is greater than 0 and less than or equal to 1.5 ($0<y\leq1.5$).

In one embodiment, the cell, in an as prepared condition, comprises the vanadium oxide compound $V_6O_{13}$ in an initial fully discharged, or uncharged, state and the positive electrode active material comprises a lithium compound characterized by an ability to react electrochemically with the vanadium oxide compound to release ions for intercalation into the vanadium oxide compound of the negative electrode during charging of the battery. Preferably, the positive electrode active material is represented by the nominal general formula $Li_xMn_2O_4$ having x greater than or equal to 0 and less than or equal to 1. In an initial condition, the $Li_xMn_2O_4$ is $Li_1Mn_2O_4$, and during charging of the battery, the value of x declines from about 1 down to about 0. Upon subsequent charge and discharge from the initial condition the positive electrode is represented by $Li_xMn_2O_4$ with x greater than 0 and less than or equal to 1. After such charge from an initial uncharged state, the negative electrode compound represented by $Li_yV_6O_{13}$ is subsequently cycled (charge and discharge) and the value of y varies from a practical view, in use, due to some irreversibility so that during cycling y is greater than 0 and less than 8.

In one embodiment, the negative electrode is included in the cell, in an as assembled, initial condition, with the negative electrode being at least partially charged where $Li_yV_6O_{13}$ contains y greater than 0. Desirably, the degree of prelithiation and precharge results in the negative electrode active material in an initial condition corresponding to $Li_1V_6O_{13}$, with y equal to about 1.

Advantageously, the negative electrode of the invention may be prepared in a fully discharged state represented by the general formula $V_6O_{13}$. Alternatively, if desired, the vanadium oxide of the invention may be prelithiated corresponding to $Li_yV_6O_{13}$ where y is greater than 0. It has been found for the first time that a negative electrode active material based on vanadium oxide may be prelithiated, precharged, without adverse consequences as to reactivity with air or moisture. This is a unique and significant characteristic of the negative electrode of the present invention. It has further been found that the cell configuration containing the negative electrode of the invention demonstrates excellent cycling capacity with an insignificant decline in capacity even over repeated cycling. The capacity effectively remains very little changed from the initial condition and exceeds performance expected in a cell which does not contain any metallic lithium.

Objects, features, and advantages of the invention include an improved electrochemical cell or battery based on lithium which has improved charging and discharging characteristics, a large discharge capacity, and which maintains its integrity over a prolonged life cycle as compared to presently used anodes. Another object is to provide an anode active material which is an alternative to metallic lithium anodes. It is also an object of the present invention to provide anodes which can be manufactured more economically and relatively more conveniently and safely than present anodes, such as, metallic lithium having significant reactivity with air and moisture.

These and other objects, features, and advantages will become apparent from the following description of the preferred embodiments, claims, and accompanying drawings.

BRIEF DESCRIPTION OF THE DRAWINGS

FIG. 3 is based on 0.25 milliamp hours per square centimeter, 24 square centimeter electrode, a $V_6O_{13}$ active material loading of about 20 milligrams per square centimeter and a $LiMn_2O_4$ loading of about 18 milligrams per square centimeter.

DETAILED DESCRIPTION OF THE PREFERRED EMBODIMENTS

Figure 1:
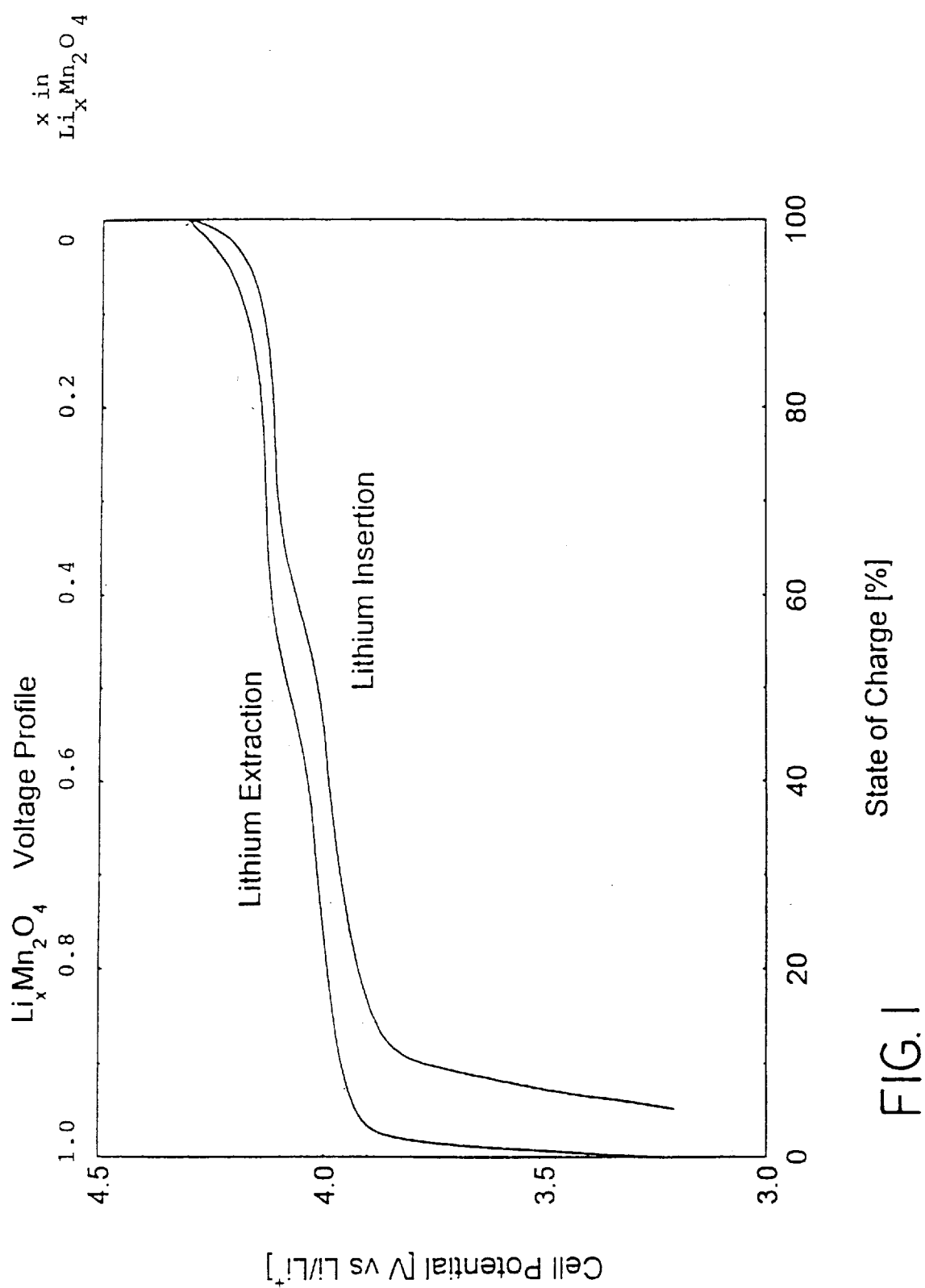
FIG. 1 shows the voltage profile of an $LiMn_2O_4$ electrode versus Li electrode.

The present invention provides an electrochemical cell or battery, which has a nonmetal negative electrode (anode). That is, no solid metal active material is used in the cell. Rather than the conventional solid lithium metal anode, the active material of the new anode comprises a compound of vanadium oxide. Accordingly, the lithium cell of the invention comprises a positive electrode and a negative electrode, where the negative electrode comprises a compound of vanadium oxide which in a fully discharged state is represented by the nominal general formula $V_6O_{13}$ or $Li_yV_6O_{13}$, y equal to 0; and, in a fully or partially lithiated, fully or partially charged state, is represented by the nominal general formula $Li_yV_6O_{13}$, where y is greater than 0 and less than or equal to 8. The unique negative electrode of the invention demonstrates exceptional performance without the disadvantages of metallic lithium negative electrodes.

Advantageously, this negative electrode may be prelithiated to obtain a degree of desired precharge. In other words, the negative electrode active material in an initial condition, as prepared for use in the cell, may be in a fully discharged state represented by the general formula $V_6O_{13}$, alternatively, if desired, the vanadium oxide may be a prelithiated vanadium oxide compound of the general formula $Li_yV_6O_{13}$ where y is greater than 0 and less than or equal to 8. It has been found for the first time that a negative electrode active material based on vanadium oxide may be prepared in an essentially prelithiated, precharged condition without adverse consequences as to reactivity with air or moisture. This is a unique characteristic of the negative electrode (anode) of the present invention. Advantageously, it has been found that an insertion of at least some lithium for at least a partial charge, for example, $Li_1V_6O_{13}$, with a potential of approximately 2.8 to 3 volts versus lithium, will be relatively stable and will essentially retain its properties and not react with air and moisture.

As used herein, the term "fully discharged state" refers to the vanadium oxide negative electrode material of the general formula $V_6O_{13}$, that is, having essentially no lithium, and also refers to a negative electrode active material of the general formula $Li_yV_6O_{13}$ where y is equal to 0, again, having no lithium present. Such fully discharged state occurs when a vanadium oxide compound of the formula $V_6O_{13}$ is prepared in typical formulation processes in an initial, as prepared, condition before partial charge and before partial lithiation. The general formula $Li_yV_6O_{13}$, where y is greater than 0 and less than or equal to 8, represents the vanadium oxide compound which is in a partially charged state with y greater than 0 and up to a fully charged state with y approaching or equal to 8. The degree of lithiation will determine the degree of charge. That is, in the case of $Li_1V_6O_{13}$ the degree of charge is less than the degree of charge achieved by $Li_2V_6O_{13}$ and so forth.

The nominal general formula $V_6O_{13}$ represents a relatively narrow range of vanadium oxide compounds with nominal stoichiometry which ranges from $VO_b$ where b is greater than 2 and less than 3 which are readily prepared by thermal decomposition of ammonium vanadate, $NH_4VO_3$, as reported in U.S. Pat. No. 4,228,226 the disclosure of which is incorporated herein by reference in its entirety. Typically, the VO compounds will range from $VO_b$ where b is greater than 2 and less than or equal to 2.5 ($VO_b$, $2<b\leq2.5$). It has been determined that $V_6O_{13+z}$ where the value of z is equal to or greater than 0, and less than or equal to 2, is highly desirable and is able to be prepared by the method described by Saidi in U.S. Pat. No. 5,419,890, the disclosure of which is incorporated herein by reference in its entirety. Preferably in $V_6O_{13+z}$, the value of z is $0<z<2$. Correspondingly, the nominal general formula of the $Li_yV_6O_{13}$ represents a relatively narrow range of highly desirable lithiated vanadium oxide compounds further defined as $Li_yV_6O_{13+z}$ where z is greater than 0 and less than or equal to 2. Accordingly, highly desirable compounds are the as prepared $V_6O_{13+z}$; and its lithiated form, $Li_yV_6O_{13+z}$ where y is greater than 0 and less than or equal to 8 ($0<y\leq8$), and z is equal to or greater than 0 and less than 2. Preferably, z is in a range $0<z\leq1.5$; corresponding to up to $V_6O_{14.5}$, and up to $Li_yV_6O_{14.5}$.

In one embodiment, the lithium battery of the invention does not contain any metallic lithium. Such battery or cell comprises an electrolyte, a positive electrode having an intercalation active material, and a negative electrode comprising the vanadium oxide compound of the invention, $V_6O_{13}$ in an initial, as prepared, before charge (precharge) state, or fully discharged state; and in a lithiated, partially or fully charged state represented by $Li_yV_6O_{13}$ where y is greater than 0 and less than or equal to 8. Since the negative electrode does not contain any lithium in an initial, as prepared, before charge state, it is necessary to provide lithium for cell operation from another component of the cell.

In one embodiment, the lithium is provided in situ from the cathode (positive electrode) which is a lithium containing compound. The positive electrode contains either a lithiated insertion compound or a ternary lithium compound able to deintercalate lithium to provide lithium ions for transport to the negative electrode. During an initial charge of the cell, the positive electrode deintercalates lithium for intercalation into the negative electrode, and during discharge the positive electrode inserts lithium while lithium is extracted from the negative electrode. The process is repeated during subsequent charge and discharge. Examples of such lithium containing compounds are lithium transition metal chalcogenide compounds. The term chalcogenide is generally taken to indicate compounds of oxygen, sulfur, selenium, and tellurium, accordingly, lithium transition metal oxygen compounds are included. Representative examples are $Li_xMn_2O_4$, $LiCoO_2$, $LiNiO_2$, $LiNiVO_4$, $LiCoVO_4$, mixtures such as $LiCoNiO_2$ and $LiTmO_2$ where Tm is a transition metal or combinations of transition metals, and mixtures thereof. In a desirable embodiment, the positive electrode is a lithium metal oxide such as lithium manganese oxide. The cathode preferably is $Li_xMn_2O_4$ with x equal to 1 in an as prepared, initial condition. The positive electrode active material (cathode) is characterized by its ability to deintercalate lithium ions during charge so that such lithium ions may be intercalated into the uncharged ($V_6O_{13}$) or partially charged ($Li_yV_6O_{13}$, $0<y<8$) vanadium oxide compounds of the negative electrode during the charging of the battery. During charging of the battery, the quantity x in the positive electrode $Li_xMn_2O_4$ declines from about 1 down to about 0. In an ideal case, all of the lithium would be deintercalated from the positive electrode and the value of x would decline to 0. Since some of the lithium may not be deintercalated during cell operation, subsequent charge and discharge, the value of x generally varies, with x being greater than 0 and less than or equal to 1.

In an alternative embodiment, the electrolyte comprises a lithium compound from which lithium ions may be released for intercalation, in situ, into the uncharged ($V_6O_{13}$) or partially charged ($Li_yV_6O_{13}$, $0<y<8$) negative electrode upon charging of the battery. A preferred lithium compound of the electrolyte is a lithium salt. Examples include $LiPF_6$, $LiAsF_6$, $LiBF_4$, $LiClO_4$, and $LiCF_3SO_3$.

In still another embodiment, some portion of the lithium intercalated into the negative electrode upon charge is supplied by the lithium compound contained in the electrolyte, and some portion of the lithium supplied to the negative electrode during charge is supplied by deintercalation from the positive electrode activematerial.

As can be seen from the embodiments described immediately above, advantageously the cell may be prepared in either a discharged condition ($V_6O_{13}$) or in a precharged, at least partially charged condition ($Li_yV_6O_{13}$, $0<y<8$). In one embodiment, in an initial condition, as assembled, the negative electrode ($V_6O_{13}$) is not charged and the cell is in an uncharged or discharged condition. The negative electrode becomes charged in situ, in the cell, by transport of lithium from another component of the cell, namely, the electrolyte, the positive electrode, or both.

In another embodiment, the negative electrode is prepared in a precharged condition external of the cell. The starting material for the negative electrode ($V_6O_{13}$) is lithiated either chemically or electrochemically to form the negative electrode ($Li_yV_6O_{13}$, $0<y$) by insertion of lithium into the $V_6O_{13}$ host material. Preparation of the precharged $Li_yV_6O_{13}$ ($0<y$) is, for example, achieved in an electrolytic precursor cell utilizing a lithium anode. In this case, the precursor preparation cell is discharged to a potential corresponding to the desired insertion degree. The desired electrochemical battery is prepared using this prelithiated anode ($Li_yV_6O_{13}$, 0<y) in combination with the desired cathode containing the desired positive electrode material, forming the battery (cell) of the invention.

Accordingly, it is possible to prepare $Li_yV_6O_{13}$ with y greater than 0 and less than or equal to 8, external of the final cell within which it is to be utilized as a negative electrode. This has advantages due to lower first cycle inefficiency which would otherwise arise in the $V_6O_{13}$ uncharged state due to side reactions on the first charge cycle with lithium in situ. In other cases, it may be more desirable to prepare the cell of the invention, in an initial condition, with the negative electrode being $V_6O_{13}$ and not charged, that is, in a before charged state or in a fully discharged state. This $V_6O_{13}$ uncharged state incurs first cycle charge inefficiency but is safe, has less reactive components, and better shelf life. It may be more desirable to prepare the cell of the invention in an at least partially charged condition, with the negative electrode being at least prelithiated ($Li_yV_6O_{13}$, y>0). For the precharged case, it is preferable that the degree of precharge not be a fully charged state as a high degree of lithiation, i.e., $Li_yV_6O_{13}$, y>0.1 may result in a material which has reactivity with air and/or moisture. It is thought that from a practical point of view, the degree of prelithiation on the order of $Li_{0.1}V_6O_{13}$ may be acceptable.

Those skilled in the art will appreciate that the invention encompasses a lithium battery which comprises the novel negative electrode comprising a vanadium oxide compound ($Li_yV_6O_{13+z}$), regardless of its degree of charge when included in a cell. In use, such vanadium oxide compound in an initial before-charge state or in a fully discharged state is represented by the nominal general formula $V_6O_{13}$, and in a lithiated, fully or partially charged state is represented by the nominal general formula $Li_yV_6O_{13}$ where y is greater than 0 and less than or equal to 8. Such negative electrode vanadium oxide compound ($Li_yV_6O_{13}$, $0 \leq y \leq 8$) is included in the battery in an as prepared, initial, condition before charging ($Li_yV_6O_{13}$, y=0) or included in the battery in a prelithiated at least partially charged state ($Li_yV_6O_{13}$, $0<y \leq 8$) as described in the alternatives immediately above.

It is required that the negative electrode active material ($Li_yV_6O_{13}$, $0 \leq y \leq 8$) has a potential versus lithium which is always less than the potential versus lithium of the positive electrode active material. This is a necessary characteristic for formation of the cell utilizing the $Li_yV_6O_{13}$ as the negative electrode active material. For example, the $Li_xMn_2O_4$, as the cathode (x greater than 0 and less than or equal to 1) demonstrates a 4 volt potential for lithium extraction and insertion versus a metal lithium electrode; and the $Li_yV_6O_{13}$, with y greater than or equal to 0 and less than or equal to 8 as the anode, demonstrates a 2 to 3 volt potential upon lithium extraction and insertion against a metallic lithium electrode. Accordingly, by the unique cell of the invention, one is able to obtain a 1.5 to 1.8 volt system which is the difference between the 4 volt potential of the positive electrode active material and the 2 to 3 volt potential (nominally 2.5 volt) of the $Li_yV_6O_{13}$. Accordingly, the novel $Li_yV_6O_{13}$ anodes of the invention are advantageously used with a variety of cathode active materials so long as the cathode active material has an electrochemical potential greater than that of the negative electrode as defined above. The $Li_xMn_2O_4/Li_yV_6O_{13}$ cell potential is shown to be the difference between that of $Li_yV_6O_{13}$ versus Li and $LiMn_2O_4$ versus Li; such difference constitutes a value between that of the $Li_xMn_2O_4$ versus Li and the $Li_yV_6O_{13}$ versus Li, with the potential of the negative electrode ($Li_yV_6O_{13}$) versus Li being less than that of the positive electrode.

Without wishing to be held to any particular theory, for an ideal cell, the chemical formula for the negative electrode when fully charged will be $Li_8V_6O_{13}$. This means that 8 moles of lithium have been inserted for each 1 mole of $V_6O_{13}$. Ideally, when a battery is formed, for example, using the $LiMn_2O_4$ cathode material, the weights of both electrodes are derived so that for every 8 moles of lithium deintercalated from 8 moles of $LiMn_2O_4$, 8 moles of lithium are inserted for each mole of $V_6O_{13}$ to achieve the optimum cell balance. Ideally, the positive electrode $Li_1Mn_2O_4$ loses all of its Li+ upon charge and becomes $Li_0Mn_2O_4$ in the ideal case, which is equivalent to a lambda $MnO_2$ structure.

Figure 2:
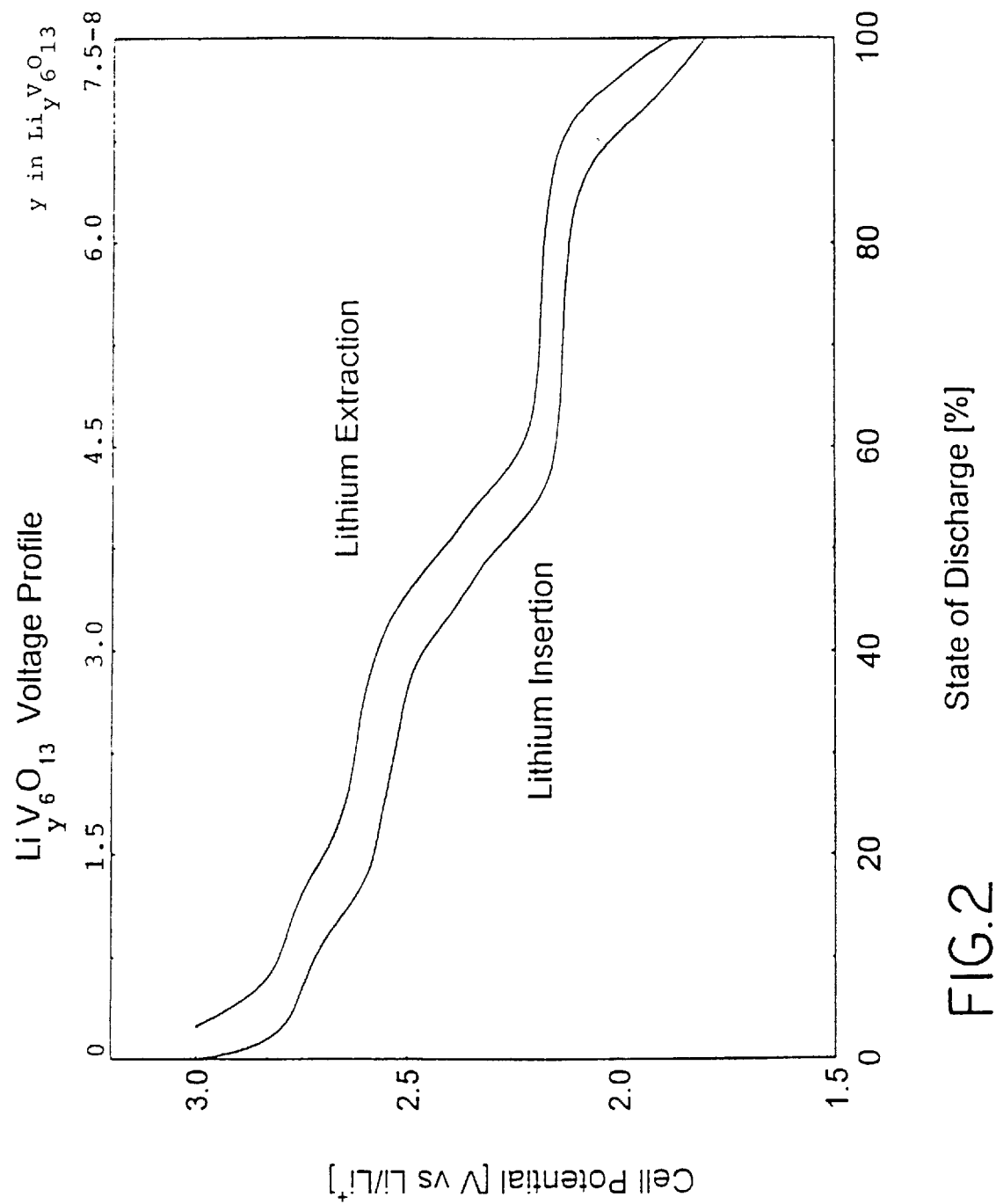
FIG. 2 shows the voltage profile of a $V_6O_{13}$ electrode versus Li electrode.
Figure 3:
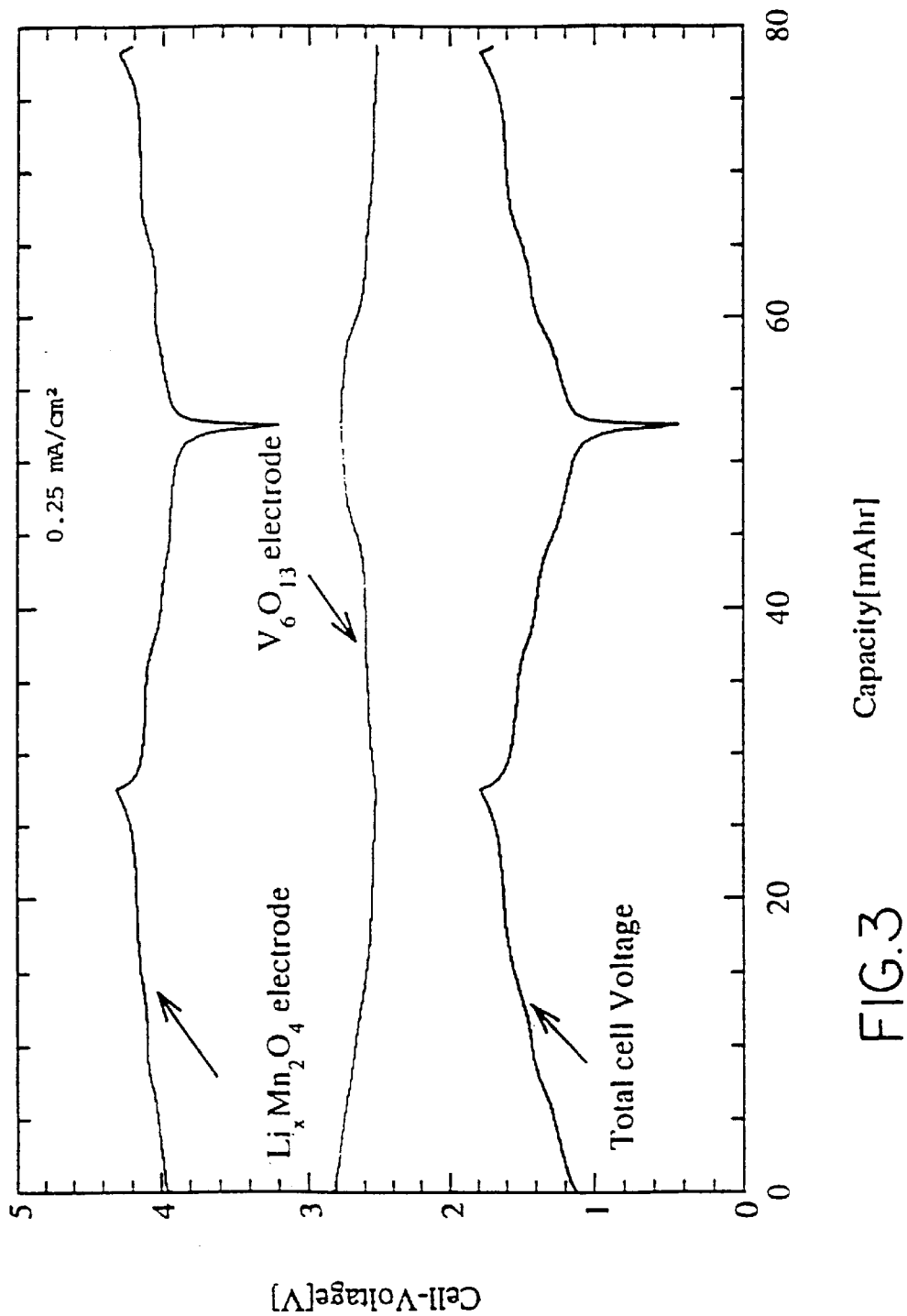
FIG. 3 shows a voltage profile derived from the electrode couples of FIGS. 1 and 2, as used in a rocking chair battery, based on $LiMn_2O_4$ positive electrode and $V_6O_{13}$ negative electrode. This shows a 3-electrode cell where the additional reference electrode (Li) is used in order to discriminate the individual responses from the positive electrode and the negative electrode.

In summary, the high operating voltage of the $LiMn_2O_4$ preferred electrode (4 volts) combined with the approximately 2.5 volt average voltage for the $Li_yV_6O_{13}$, results in a battery of approximately 1.5 volts with good cycling capabilities. Simulation of the individual electrochemical properties of both electrodes was done using a cell design incorporating a referenced electrode. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemica Acta, Vol. 40, No. 11, at 1603 (1995). Results presented in FIGS. 1 and 2 show the voltage profile and potential versus lithium metal electrode. FIG. 3 shows the three electrode configuration cell and highlights the very high and heretofore unexpected degree of reversibility of lithium ion reactions of the individual electrodes upon repeated charge and discharge. The corresponding $Li_yV_6O_{13}/LiMn_2O_4$ battery (FIGS. 4 through 6), referred to as a rocking chair battery, exhibits exceptional cycling capability and renders it a very attractive commercial alternative as a 1.5 volt rechargeable battery.

Figure 7:
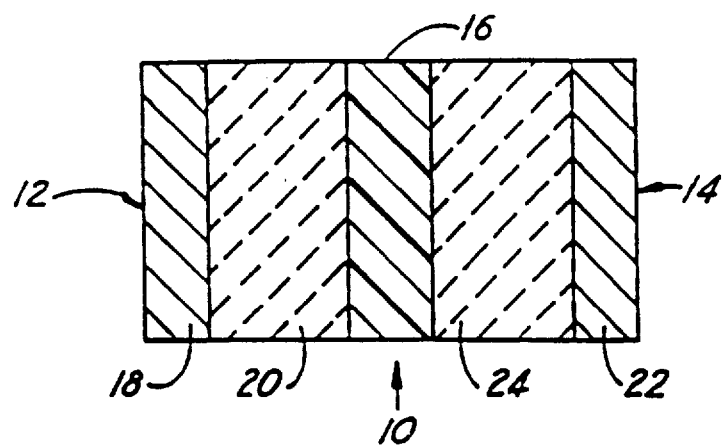
FIG. 7 is an illustration of a cross-section of a thin battery or cell embodying the invention.

A description of the electrochemical cell or battery which uses the novel active material of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 7, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, iron, stainless steel, and copper, and such foils having a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any ionically conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; and 5,037,712. Each of the above patents is incorporated herein by reference in its entirety.

Electrodes of the invention are made by mixing a binder, the active material, and carbon powder (particles of carbon). The binder composition is desirably a binder/electrolyte such as polymeric acrylates (plastics) which are x-linked by radiation curing or may be based on conventional electrolyte/binder systems. The binder/electrolyte is preferably the polymeric acrylate (plastic) with ionic conduction capability. After mixing, the resulting paste, containing the binder, active material, and carbon, is coated onto a current collector, and any polymer content is polymerized, and cross-linked by heat radiation or other curing means.

EXAMPLE

The positive electrode containing $LiMn_2O_4$ and the negative electrode containing $Li_yV_6O_{13}$ were both prepared by essentially the same method. For each electrode, the content was as follows: 50 to 90 percent by weight active material ($LiMn_2O_4$ or $Li_yV_6O_{13}$); 5 to 30 percent carbon black as the electric conductive diluent; and 3 to 20 percent binder preferably chosen to enhance ionic conductivity. The stated ranges are not critical. The amount of active material may range from 25 to 85 weight percent. The formation of each electrode will now be described. The positive electrode was prepared from mixtures of lithium-manganese oxide (active material) and EPDM (ethylene propylene diene monomer) as the binder, Shawinigan Black® was used as the carbon powder conductive diluent. The carbon powder conductive diluent is used to enhance electronic conductivity of the lithium-manganese oxide.

Shawinigan Black®, available from Chevron Chemical Company, San Ramone, Calif., has a BET average surface area of about 70±5 square meters per gram. Other suitable carbon blacks are sold under the designation Super P™ and Super S™ available from MMM, a subsidiary of Sedema, which carbons have BET surface areas of about 65±5 square meters per gram. (MMM Sedema, S. A., has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the active material $LiMn_2O_4$, the binder (EPDM), and the carbon particles (Shawinigan Blacks®). These were mixed and blended together with a solvent. Xylene is a suitable solvent. The mixture was then coated onto an aluminum foil current collector to achieve a desired thickness for the final electrode. A similar procedure was used to form the unique anode of the invention. The anode was formed from the active material ($V_6O_{13}$), the binder (EPDM), and carbon powder (Shawinigan Black®). The active material, binder, and carbon were blended together with a solvent (xylene). The mixture was then coated on the current collector to a desired thickness for use as the negative electrode. The aluminum foil current collector was about one half mil thick (12 microns).

The electrolyte used to form the completed cell was a combination of EC/DMC. That is ethylene carbonate (EC) and dimethyl carbonate (DMC). The ratio of EC:DMC was 2:1 by weight. The positive and negative electrodes were maintained in a separated condition using a fiberglass layer. Such separation can also be achieved using a layer of Celgard™. Hoechst—Celanese Corp., Celgard 2400™, porous polypropylene, 25 microns thick.)

The $Li_yV_6O_{13}$ active material of the invention is prepared by the processes described earlier. The $Li_yV_6O_{13}$ with y greater than 0 is prelithiated. The precursor $V_6O_{13}$ is prepared by the method of U.S. Pat. Nos. 4,228,226; 5,419,890 or may be obtained from a vendor, such as Kerr-McGee Company, in the form of $V_6O_{13}$ powder of BET area 10 to 15 square meters per gram. The preferred $Li_1Mn_2O_4$ positive electrode material may be obtained from Kerr-McGee Company, in the form of $LiMn_2O_4$ powder of BET area 1 to 3 square meters per gram. Ball-milling is used to achieve a particle size of about 5 to 10 microns.

The $Li_xMn_2O_4$ powders which form the basis of the active material for the cathode, can be prepared by a method as described by Barboux, Tarascon et al in U.S. Pat. No. 5,135,732, issued Aug. 4, 1992 and incorporated by reference in its entirety. This reference is illustrative of a suitable method and is not limiting. This method produced active material which is used as the cathode (positive electrode) active material. Such methods are used to produce positive electrodes for use with negative electrodes of metallic lithium. There is also described a 3 volt lithium-manganese oxide cathode material for use with metallic anodes in an article entitled "A 3 Volt Lithium-Manganese Oxide Cathode for Rechargeable Lithium Batteries" by Haitao Huang and Peter Bruce as published in J. Electrochem. Soc., Volume 141, No. 7, July 1994. The manganese oxide cathode of the nominal general formula $LiMn_2O_4$ is prepared with a specific composition $LiMn_2O_{4.1}$. These are considered to be essentially a defect lithium-manganese oxide spinel $LiMn_2O_{4.1}$ prepared by a solution route. Accordingly, the term "nominal general formula $Li_1Mn_2O_4$" represents a family of suitable $LiMn_2O_4$ type compositions including those with the defect spinel with a higher average oxidation state than the typical stoichiometric $LiMn_2O_4$. Other spinel type materials are suitable, such as, $Li_2Mn_4O_9$ and $Li_4Mn_5O_{12}$ as well as chemical manganese dioxide, a mixture $\gamma/\beta Mno_2$, and lithiated spinels. In the Huang et al process, a minor amount of carbon is added to the solution in order to achieve the defective spinel. However, such carbon is less than that typically included in a cathode formulation and additional carbon is typically added as described more fully below.

Various methods for fabricating electrochemical cells and for forming electrode components are described herein. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. No. 5,435,054 (Tonder & Shackle); U.S. Pat. No. 5,300,373 (Shackle); U.S. Pat. No. 5,262,253 (Golovin); U.S. Pat. No. 4,668,595; and U.S. Pat. No. 4,830,939 (Lee & Shackle). Each of the above patents is incorporated herein by reference in its entirety.

The configuration of cells used for testing in FIGS. 1 and 2 were based upon individual performance of the $LiMn_2O_4$ positive electrode and the $V_6O_{13}$ negative electrode separately (FIGS. 1 and 2). The configuration of the cell in FIG. 3 contained $Li_yV_6O_{13}$ and $Li_xMn_2O_4$ used in combination together to form a rocking chair battery, and with a reference electrode (FIG. 3). FIG. 1 shows the voltage profile of an individual $LiMn_2O_4$ electrode versus a lithium metal electrode and demonstrates that this $LiMn_2O_4$ electrode has a greater potential versus lithium than the $V_6O_{13}$ electrode of FIG. 2. Accordingly, FIG. 2 shows the voltage profile of an individual $V_6O_{13}$ electrode versus a lithium metal electrode. This demonstrates that the $V_6O_{13}$ electrode has a lesser potential versus lithium as compared to the lithium-manganese oxide electrode of FIG. 1. In FIG. 1, the $Li_xMn_2O_4$ has a lithium content of 1 ($Li_1Mn_2O_4$) at approximately 3.2 to 3.3 volts, and demonstrates a cell potential versus lithium of approximately 4.3 volts. When all the lithium is extracted, $Li_xMn_2O_4$ becomes $Li_0Mn_2O_4$ and the voltage is approximately 4.3 volts. FIG. 2 shows the voltage profile of $Li_yV_6O_{13}$ versus lithium and demonstrates the lesser potential of $Li_yV_6O_{13}$ as compared to $Li_xMn_2O_4$. In FIG. 2, when y equals 0, the potential versus lithium is just below about 3 volts. When the $Li_yV_6O_{13}$ becomes progressively lithiated, the potential versus lithium drops. At a potential versus lithium of about 1.75 volts, the $Li_yV_6O_{13}$ has a value of y equals 7.5 to 8.

Figure 4:
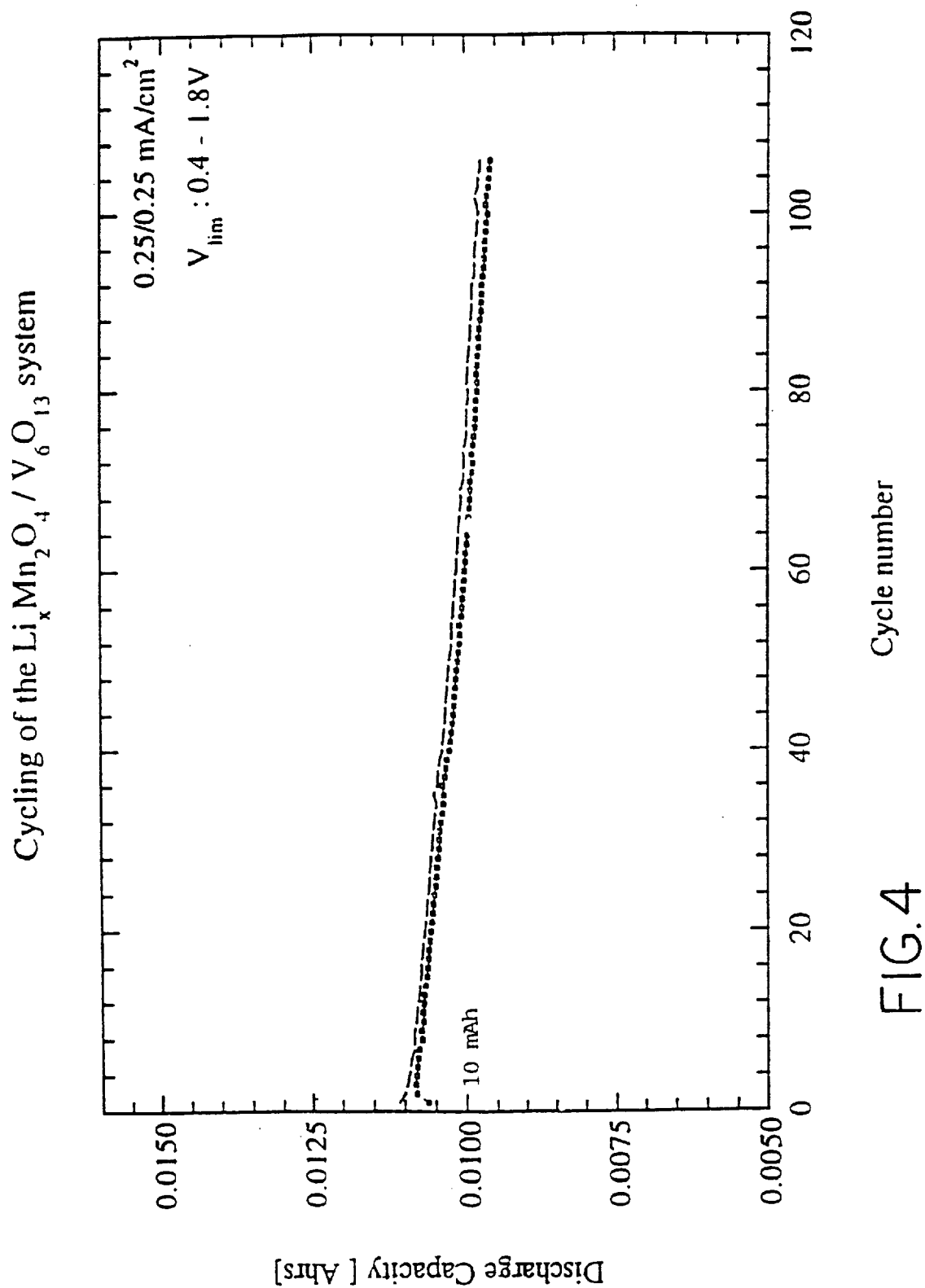
FIG. 4 shows the cycling behavior of the $LiMn_2O_4/V_6O_{13}$ cell of the invention. The conditions of FIG. 4 include 0.25/0.25 milliamps per square centimeter; voltage limit: 0.4 to 1.8 volts; 12 square centimeters electrode area; about 20 milligrams per square centimeter loading of $V_6O_{13}$; and about 18 milligrams per square centimeter $LiMn_2O_4$ loading. The 10 milliamp hours corresponds to 46 milliamp hours per gram of $LiMn_2O_4$ electrode weight, and 41 milliamp hours per gram of $V_6O_{13}$ electrode weight.

FIG. 3 shows the voltage profile of a 3 electrode cell using $Li_xMn_2O_4$ and $Li_yV_6O_{13}$ as the working electrodes. The additional reference electrode is used to help ascertain the individual performances of the $LiMn_2O_4$ and $V_6O_{13}$ electrodes. As can be seen from FIG. 3, the $V_6O_{13}/LiMn_2O_4$ cell demonstrates good voltage and capacity. The electrodes of FIG. 3 were based on 24 square centimeters. The $V_6O_{13}$ electrode loading was approximately 20 milligrams per square centimeter geometric area. The $LiMn_2O_4$ electrode loading was approximately 18 milligrams per square centimeter, and was 24 square centimeters. Although the cells used for testing in FIGS. 1 through 4 showed good performance, the lithium-manganese oxide electrode limited the optimal performance. This was because the capacities of the electrodes were not matched. For example, the vanadium oxide ($V_6O_{13}$) had a specific capacity of about 350 milliamp hours per gram; whereas, the lithium-manganese oxide is about 148 milliamp hours per gram. Such mismatched electrodes were only used in order to obtain an understanding of cycling behavior. For determining cycling behavior the quantity of active material in each electrode is not critical because capacity is not being monitored, rather performance in terms of cyclability is being monitored. FIG. 4 shows the cycling capacity of the cell prepared according to the invention. The term "cycle" refers to a consecutive charge/discharge cycle. The ability of the cell or battery to maintain a useful capacity for many cycles indicates the useful life of the cell or battery. In that regard, FIG. 4 shows an exceptionally high cyclability without degradation of capacity. Such performance has not been demonstrated before except where metallic anodes are used. As was the case in regard to FIG. 3, the electrodes of FIG. 4 were mismatched and the capacity was limited by the $LiMn_2O_4$. Nevertheless, a capacity of 0.01 amp hours (10 milliamp hours) was demonstrated based on electrodes of 12 square centimeters. This performance for a 1.8 volt system is very favorable and exceeds the performance expected in a cell which does not contain any metallic lithium.

In FIG. 4, the 10 milliamp hours performance was obtained using electrodes 12 square centimeters in area. The $V_6O_{13}$ electrode contained 20.2 milligrams per square centimeter and the $LiMn_2O_4$ electrode contained 18.4 milligrams per square centimeter. Accordingly, the total weight of electrode active material was about 240 milligrams of $V_6O_{13}$ and about 216 milligrams of $LiMn_2O_4$. This corresponds to respective performances in milliamp hours per gram of electrode active material weight of 46 ($LiMn_2O_4$) and 41 ($V_6O_{13}$) which is exceptionally good and surprising. That such capacity is available and is consistently maintained over 100 cycles is truly exceptional and heretofore unexpected in a non-metallic battery.

As mentioned above in connection with FIGS. 3 and 4, the capacity demonstrated in FIGS. 3 and 4 is not optimized. Accordingly, another set of cells was prepared in order to increase the amount of lithium-manganese oxide to provide additional capacity required to fully utilize the vanadium oxide electrode. This is necessary because the vanadium oxide has a specific capacity of about 350 milliamp hours per gram whereas the lithium-manganese oxide is 148 milliamp hours per gram. The cells having optimized electrode formulations are shown in FIGS. 5 and 6.

Figure 5A:
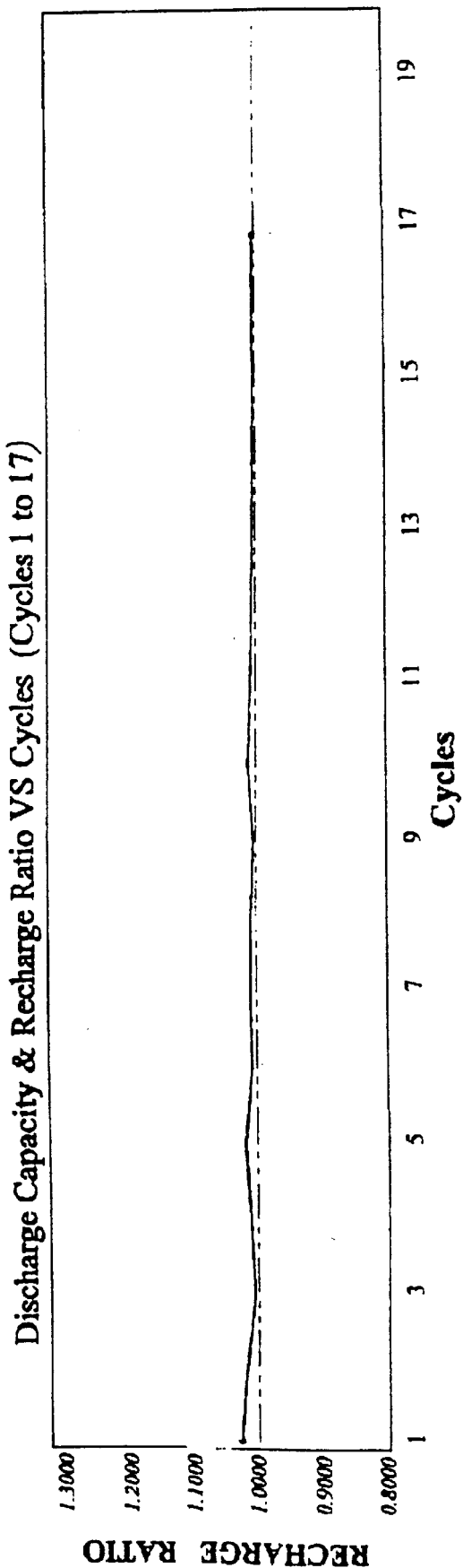
FIG. 5 is a two part graph with FIG. 5A showing the excellent rechargability of the $LiMn_2O_4/V_6O_{13}$ cell.
FIG. 5B shows the excellent cycling and capacity of the $LiMn_2O_4/V_6O_{13}$ cell of the invention. The conditions of the cell in FIG. 5 are $V_6O_{13}$ loading of 6.5 milligrams per square centimeter and $LiMn_2O_4$ loading of 18.4 milligrams per square centimeter. The electrode geometric area is 24 square centimeters, and the capacity is 0.5 milliamps per square centimeter. The cell configuration of FIG. 5 demonstrates an excellent capacity of 0.046 amp hours with an insignificant decline to 0.043 amp hours after over 17 cycles. The $LiMn_2O_4$ is estimated at 104 milliamp hours per gram and the $V_6O_{13}$ is estimated at 295 milliamp hours per gram.
Figure 5B:
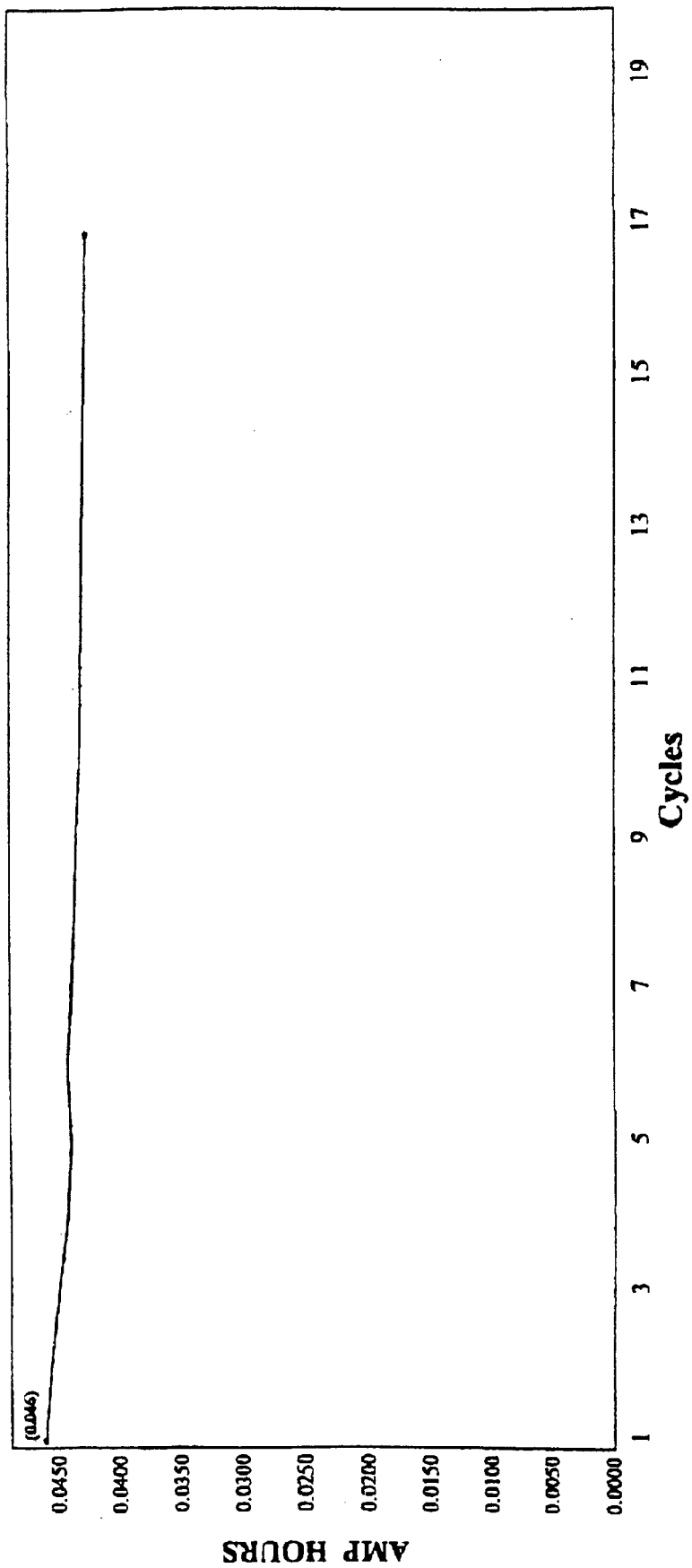
Figure 6:
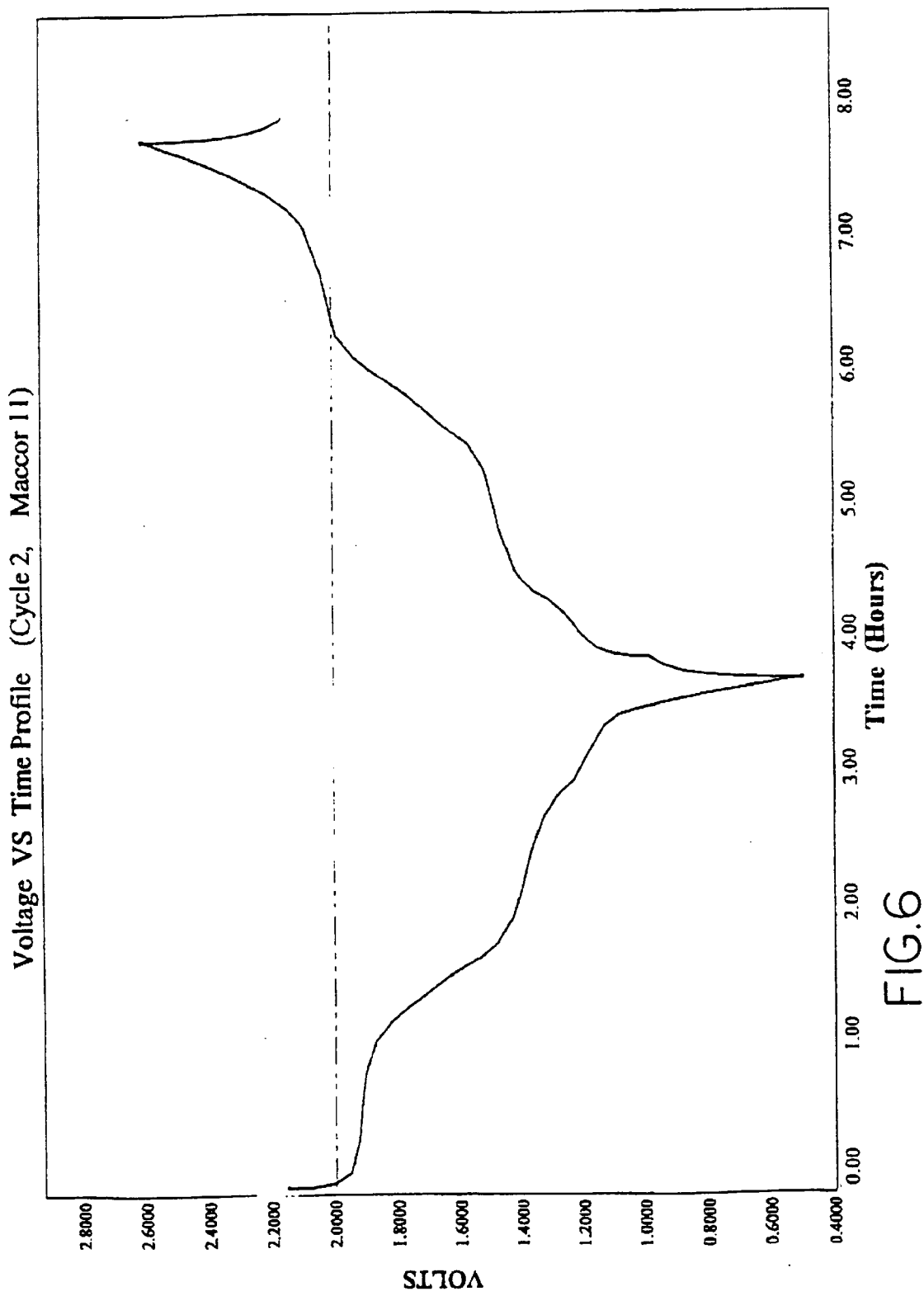
FIG. 6 is a graph of potential over time for the second cycle of the $V_6O_{13}/LiMn_2O_4$ cell of the invention.

FIG. 5 shows performance of $V_6O_{13}/LiMn_2O_4$ cell using electrodes of 24 square centimeters. The $V_6O_{13}$ electrode contains 6.5 milligrams per square centimeter of $V_6O_{13}$ and the positive electrode contains 18.4 milligrams of $LiMn_2O_4$ per square centimeter. The cell performance at approximately 0.5 milliamps per square centimeter was demonstrated to be approximately 0.046 amp hours (46 milliamp hours). The 24 centimeter square $V_6O_{13}$ electrode contained 156 milligrams of $V_6O_{13}$ and the $LiMn_2O_4$ electrode contained 442 milligrams of $LiMn_2O_4$. (6.5×24 and 18.4×24.) Dividing the 46 milliamp hours by the 156 milligrams of $V_6O_{13}$ electrode weight and performing the necessary conversion yields a performance of over 294 milliamp hours per gram. A similar calculation yields a $LiMn_2O_4$ electrode performance of 104 milliamp hours per gram. This performance is far in excess of the performance expected by a cell which does not contain metallic lithium. This result is truly advantageous and amazing, especially given that the capacity is maintained over a large number of cycles. For example, as shown in FIG. 5 after over 17 cycles the capacity remains high, at about 43 milliamp hours. Those skilled in the art will appreciate that the ratio of 18.4:6.5 means that there is about 2.8 times more weight in the lithium-manganese oxide electrode than in the vanadium oxide electrode. This is derived based on the number of moles of lithium transferred between such electrodes during charge and discharge. For example, $LiMn_2O_4$ has a molecular weight of approximately 181 grams per mole and $V_6O_{13}$ has a molecular weight of approximately 514 grams per mole. Since $V_6O_{13}$ is capable of intercalating up to about 8 moles of lithium per unit of $V_6O_{13}$, it is necessary, in a balanced cell, to ideally have enough lithium-manganese oxide to deliver such 8 moles of lithium for intercalation into each unit cell of $V_6O_{13}$. On that basis, it is necessary to have 8 times the molecular weight of $LiMn_2O_4$ in the cell for each mole of $V_6O_{13}$. (181 grams per mole of $LiMn_2O_4$×8 moles= 1448 grams.) This corresponds to 1448 grams of $LiMn_2O_4$ for every 514 grams of $V_6O_{13}$, hence the ratio of 2.8:1 weight of lithium-manganese oxide to vanadium oxide. Further, as shown in FIG. 5, the lithium-manganese oxide ($Li_xMn_2O_4$) demonstrated 104 milliamp hours per gram and the vanadium oxide ($V_6O_{13}$) demonstrated 295 milliamp hours per gram. FIG. 6 shows the voltage versus time profile of the second cycle of the $V_6O_{13}$/$LiMn_2O_4$ cell having the configuration as described in connection with FIG. 5. FIG. 6 shows the voltage profile during discharge and charge (during a typical full cycle) for a $LiMn_2O_4$/$V_6O_{13}$ cell.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. A lithium battery which comprises a positive electrode and a negative electrode, said negative electrode having an active material comprising an oxide of vanadium and said positive electrode having an active material which is a lithium chalcogenide compound different from $Li_yV_6O_{13+x}$, with $0 \leq y < 8$ and $0 < x < 2$; said negative electrode comprising said oxide of vanadium, represented by the formula $Li_yV_6O_{13+z}$, where y is greater than or equal to 0 and less than or equal to 8, where z is greater than 0 and less than 2; and having said oxide which, when fully or partially lithiated with lithium ions and fully or partially charged, is represented by said formula $Li_yV_6O_{13+z}$ where y is greater than 4; and having said oxide which, in an unlithiated, uncharged state, or fully discharged state, is represented by said formula $Li_yV_6O_{13+z}$ with y equal to 0, corresponding to $V_6O_{13+z}$; said oxide further characterized by an inherent monoclinic crystal structure, and is in the monoclinic crystal structure condition after repeated charging and discharging.

2. The battery according to claim 1 further comprising an electrolyte interposed between said positive electrode and said negative electrode; and where at least one of said electrolyte and active material of said positive electrode comprises a lithium compound characterized by an ability to react electrochemically with said oxide and releases lithium ions for intercalation into said oxide during charging of said battery.

3. A lithium ion battery which comprises: a positive electrode and a negative electrode, said negative electrode having an active material comprising an oxide of vanadium and said positive electrode having an active material which is a lithium chalcogenide compound different from $Li_yV_6O_{13+x}$, with $0 \leq y < 8$ and $0 < x < 2$; said negative electrode comprising said oxide of vanadium which is characterized by an uncharged or fully discharged state which is lithium-free and represented by the formula $V_6O_{13+z}$, and by a charged state represented by the formula $Li_xV_6O_{13+z}$, $4 < x \leq 8$, where z is greater than 0 and less than 2; said oxide further characterized by an inherent monoclinic crystal structure and is in monoclinic crystal structure after repeated charging and discharging.

4. A rechargeable lithium battery having non-metallic electrode active material, which has a nominal operating potential in the range of about 1 to about 2 volts, and which maintains over 60 percent of its discharge capacity after 80 cycles at a current density of about 0.5 m A/cm$^2$; said battery comprising a positive electrode and a negative electrode, said negative electrode comprising a monoclinic structured active material consisting of an oxide of vanadium, represented by the formula $V_6O_{13+z}$, where z is greater than 0 and less than 2, and said positive electrode having an active material represented by the formula $Li_xMn_2O_4$ having $0 < x < 1$; said positive electrode active material characterized by deintercalation of lithium ions therefrom for intercalation into the negative electrode active material during charging of said battery, whereupon x in $Li_xMn_2O_4$ declines from said value of about 1 during said charging; and wherein said anode active material contains said oxide of vanadium as the only transition metal oxide therein, and is in the monoclinic crystal structure condition after repeated charging and discharging of said battery.

* * * * *